Feb. 8, 1966 H. W. SARGENT, JR 3,234,560

SUBSCRIPTION TELEVISION METER

Filed May 1, 1961 2 Sheets-Sheet 1

INVENTOR.
H. W. Sargent, Jr.
BY
Townsend and Townsend
attorneys

INVENTOR.
H. W. Sargent, Jr
BY
Townsend and Townsend
Attorneys

United States Patent Office 3,234,560

Patented Feb. 8, 1966

3,234,560

SUBSCRIPTION TELEVISION METER

Horace William Sargent, Jr., Little Rock, Ark., assignor, by mesne assignments, to Subscription Television, Inc., New York, N.Y., a corporation of Delaware Filed May 1, 1961, Ser. No. 106,800
8 Claims. (Cl. 346—50)

This invention relates to subscription television systems and more particularly to a meter for recording billing information for subscription television systems.

The advent of subscription television systems of a variety of forms has focused new attention on various meters for recording or storing information relative to the selection and charging for the pay television programs. For the various pay television systems proposed, different types of billing arrangements have been suggested. In one particular type proposed, a coin demand system, the charging and billing apparatus includes a device responsive to the deposit of selected coins therein to generate a proper signal and connect it to the system proper when the correct charge has been made. This acts to unscramble the garbled radiowave transmission signals. In other systems, various billing procedures have been visualized, many of which use mechanical apparatus or tape mechanisms to provide records of the subscriber's selections for billing purposes.

In my copending application filed on an even date herewith, which discloses a pay television system wherein a plurality of pay television channels are transmitted over a closed wire system at subcarrier frequencies for selective conversion to an open channel in a subscriber's television receiver, the instant meter is briefly described. The pay television system therein disclosed provides a straightforward and simple answer to the demands of competing non-wire systems and yet provides the convenience and economies that make the wire service superior to virtually all non-wire systems that principally depend upon garbling or scrambling the video signals.

The exemplary pay television system which includes the subscription television meter of the present invention provides a prevew and two pay television programs. The carriers for these three programs are transmitted in distinct bands over a common cable to all subscribers' receivers. There the individual decoding and selecting apparatus consists basically of a receiver-converter or subscriber system and a meter and charging apparatus, herein denominated as the subscription television meter. The receiver-converter upon selection of one of the three channels by the subscriber through a push button arrangement selects the desired program channel and its carriers and converts them to an open or unused channel in the tuner of the receiver front end. If the channel the subscriber selects is the preview channel, there is no charge made inasmuch as no signal is connected at this time to the subscription television meter. On the other hand, if the subscriber views one of the two pay television channels by actuating an appropriate push button switch, he converts the selected pay channel to the open channel in his own receiver and at the same time provides a signal to the subscription television meter for noting the fact that that particular program was selected for viewing. The rotative position of the charge card associated with the meter on each subscriber's premises is controlled from the main station by a signal carrier which advances the charge card support table for each group of program changes so that unique individual marks are provided each time a particular pay program is selected by a subscriber.

A system in which the present meter is used is disclosed in my copending application, Serial No. 106,799, filed on May 1, 1961, now U.S. Patent No. 3,123,145, to which reference should be made for a more detailed explanation.

Briefly, the present meter comprises a table or platen rotatively positioned by a ratchet mechanism and includes a pair of electromagnetic devices operable individually to uniquely mark a charge card supported on the platen in an indexed position. A stepping relay of the ratchet mechanism is controlled from the main station and is energized each time the programs offered on the pay channels are changed. Thus, each angular position of the charge card is referenced to a particular system offering. The marking devices are individually associated with the two pay program channels so that a selection by a subscriber marks which of a number of offered programs has been selected for viewing.

The principal object of the present invention is to provide a subscription television meter which is economical to manufacture, simple to operate, and requires minimum maintenance.

A further object is to provide a meter that is mounted outside of a subscriber's home and is therefore readily serviced without obtaining access to the subscriber's home.

Another object of the present invention is to provide a subscription television meter which is easily modified to permit expansion of the system through the provision of additional pay television programs.

Another object of the invention is to provide a television meter which is controlled electromagnetically and therefore requires no elaborate memory or other electronic circuits to record information on program selections during the course of a billing period.

A feature of the present invention pertains to the provision of a subscription television meter adapted for use in a variety of commercial or pay television systems.

Another feature of the invention pertains to the use of a simple indexing card for each subscriber station to indicate particular pay programs selected for viewing during the course of a billing period.

Yet another feature of the invention pertains to the means for advancing the card support platen a selected number of angular degrees or an integral number of steps for each revolution of the card. This latter feature is accomplished by controlling the movement of the charge card through the stepping relay energized at the main station.

Still another feature of the invention pertains to the arrangement that permits the meter to be expanded to accomodate more than two pay television channels. This feature is realized by increasing the number of circular grooves in the top of the platen and disposing an equal number of electromagnetically actuated perforating devices above and overlying the circular grooves, each perforating device-groove combination corresponding to one of the pay television program offerings.

Yet another feature of the invention pertains to the use of electromechanical devices to rotate the platen and actuate the perforating devices that identify which pay program is selected for viewing.

Still another feature of the invention pertains to the means cooperating with the stepping relay to prevent loss of the reference relationship between main station signals and the subscribers' meters. This latter feature includes stabilizer and anti-reverse means cooperating with a finger on the stepping relay to prevent reverse rotation of the platen and to limit an advance to one increment at a time.

These and other objects, advantages and features of the present invention may be more fully understood when the following detailed description is read with reference to the drawings in which.

Figure 1:
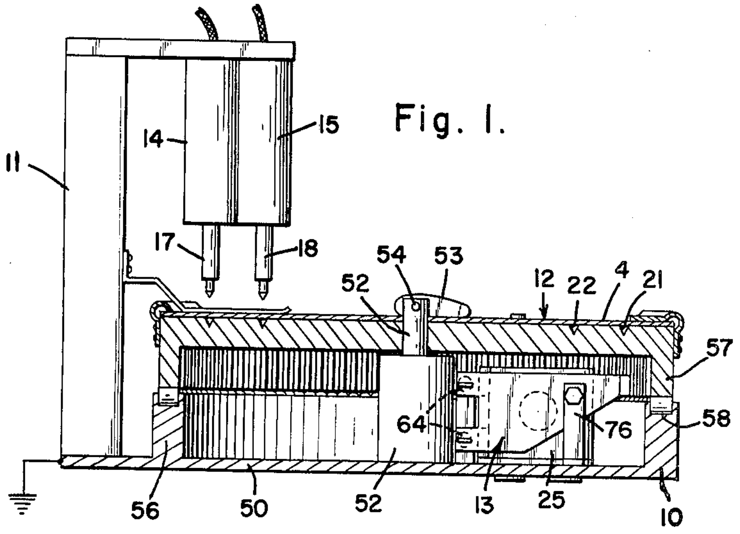
FIG. 1 is a side view of the subscription television meter forming the present invention with certain portions cut away or cross sectioned to more clearly illustrate the cooperative features of the apparatus.
Figure 3:
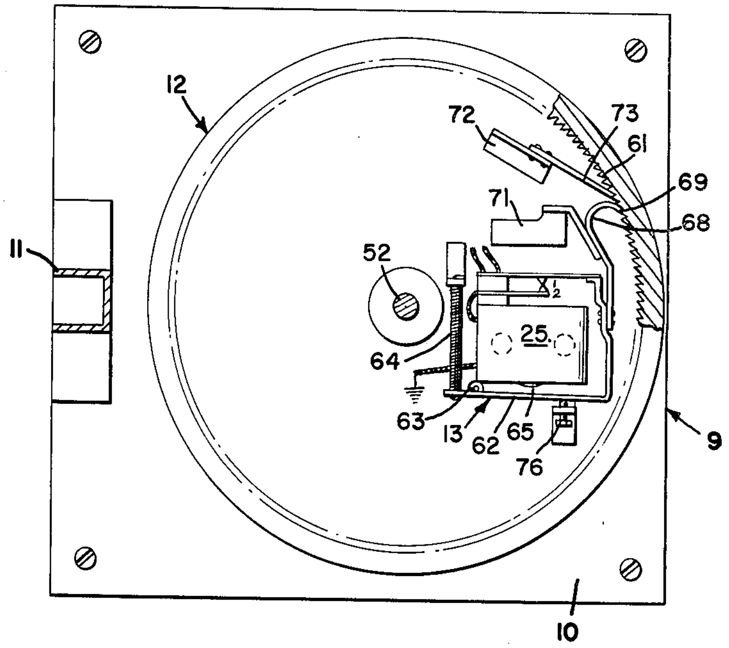
Figure 4:
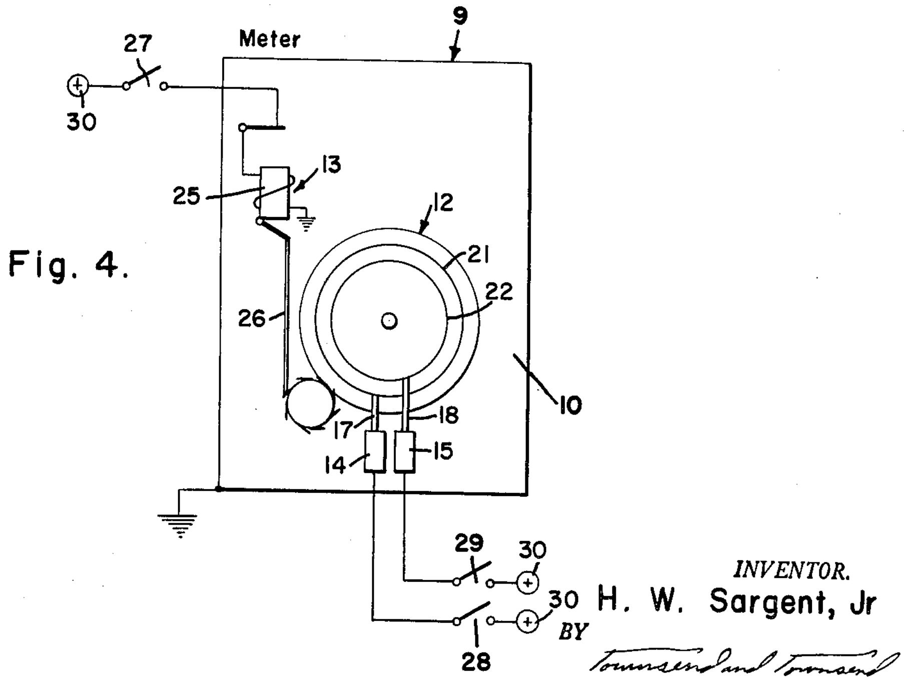

FIG. 3 is a bottom view of the subscription television meter of FIG. 1 with certain parts omitted to illustrate the ratchet mechanism for incrementally rotating the charge card platen; and FIG. 4 is a schematic representation of the pay television meter of the present invention illustrating the input terminals for signals from the main station and receiver-converter switching circuits of the exemplary pay television system of which the meter is a part.

Figure 2:
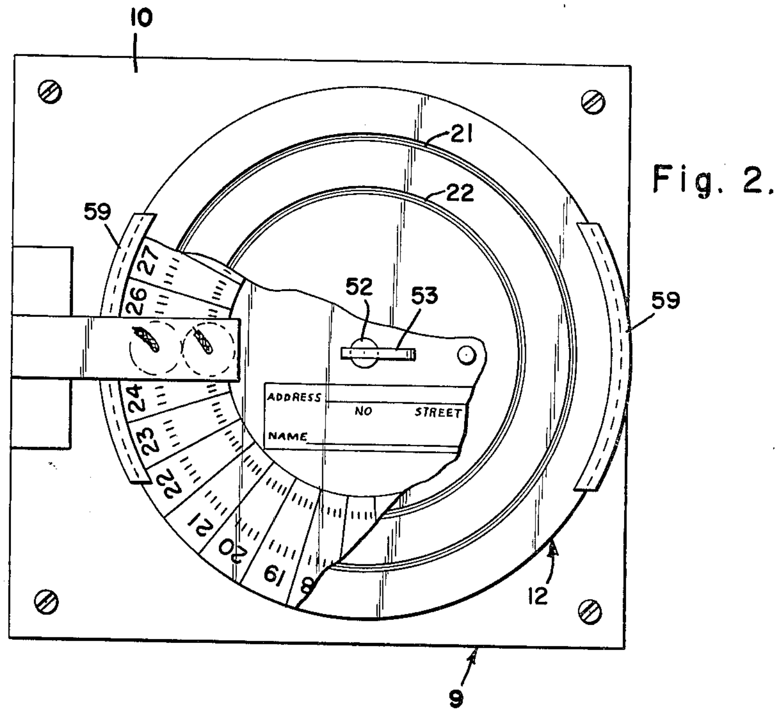
FIG. 2 is a plan view of the meter of FIG. 1 with a portion of a charge card depicted therewith to illustrate its cooperation with the platen of the meter.

Before considering the details of the subscription television meter as illustrated in FIGS. 1–3, it is best to consider the functional organization of the components (FIG. 4) to understand how they cooperate with each other and in connection with the pay television system disclosed in my copending application, Serial No. 106,779, now U.S. Patent No. 3,123,145. A diagram similar to FIG. 4 is depicted as FIG. 1 of the above identified application.

The meter 9 includes a frame 10, a rotatably mounted platen or table 12, a ratchet mechanism 13 for rotating the platen in response to remote signals from a main station and, in the exemplary embodiment illustrated, a pair of solenoids 14 and 15 that have axially movable armatures 17 and 18, respectively, which are adapted to perforate a charge card supported on the platen 12. The top of the table or platen 12 has formed in it a pair of circular grooves 21 and 22 which respectively underlie the perforating end of armatures 17 and 18 of the electromechanical devices 14 and 15. Operation of one of the devices 14 or 15 causes the armature associated therewith to move down towards the top of the table to extend its end below the edge on the groove with which it is associated. This movement perforates a charge card disposed on the top of platen 12.

The ratchet mechanism 13 includes a stepping or ratchet relay 25 and a ratchet 26. Operation of relay 25 (by an external source from the main station) causes the armature of relay 25 to close thereby rotating the ratchet 26 to advance or rotate the table 12 approximately 2.8125 degrees, which works out to be 128 integral incremental steps per revolution of the platen 12.

Looking to the operation of the meter 9 in conjunction with the pay television system described in the above-identified referenced application, a switch in the receiver-converter circuit of the pay television system, represented by switch 27 of FIG. 4, is closed whenever the platen 12 is to be advanced, with the result that a source of power 30 is connected over the back contact of relay 25 and through its coil to ground. This energizes relay 25 and causes its armature to close and advance platen 12 one increment. The exemplary switch 27 is closed each time the group of programs transmitted over the closed wire system to subscriber stations is changed.

Once the programs are changed and the fact duly noted by rotating the platen or table 12 to a unique position corresponding to the programs then being transmitted to subscriber stations, the selection by a subscriber of one of the two pay television program channels, by closure of exemplary switch 28 or 29, energizes the solenoid 14 or 15 associated therewith. The armature associated with the energized solenoid moves downward to perforate the charge card on a circular path unique to that particular pay television channel. It should be apparent that, while two pay television program channels may be marked by the exemplary meter illustrated, it is possible to form additional circular grooves or paths at different radii in the upper surface of the platen 12 to permit the marking of a card for one of three or more pay television programs.

With the use of the meter 9 in a typical pay television system understood, it is next possible to consider the structural arrangements of the parts which effect the desired results. The meter 9 includes a frame or base member 10 having an upstanding L-shaped bracket 11 affixed to one side which acts to support the solenoids 14 and 15 in positions overlying their respective grooves 21 and 22 in the platen or table 12. An upstanding shaft 52 is affixed to the frame 50 and acts to rotatably support the platen 12. A locking device 53 is pivoted at 54 in the upper end of shaft 52 so as to maintain a charge card, partially illustrated as 4, on the top of the platen 12 during operation of the meter.

The platen 12 is also given peripheral stability by an upstanding circular support ring 56 fixedly attached to the upper surface of frame 50 with its center coinciding with the longitudinal axis of shaft 52. The platen 12 is formed in the shape of a cup or a flat table top with a circular flange 57 formed at its outer circumference and, depending downwardly at right angles towards and co-operating with said stabilizing ring 56. The upper surface of the ring 56 has a groove 58 formed therein to engage the edge of the flange 57 to permit the platen 12, as it is rotated by the ratchet means 13, to be guided by the sides of the groove 58.

The table top 12 also has a pair of oppositely disposed arcuate retaining lips 59 attached to its outer edge or flange 57 which permit the charge card 4 to be slipped thereunder and held firmly against the face of the platen 12. The circular grooves 21 and 22 formed about the top of the platen 12 are most clearly illustrated in FIGS. 1 and 2. It can be seen from FIG. 1 that the electromechanical solenoids 14 and 15 are supported by the L-shaped member 11 to overlie grooves 21 and 22 so that upon energization, their respective armatures 17 and 18 can move in a downward direction towards the top of the table 12 to perforate a charge card.

As can be seen best in FIGS. 1 and 3, the interior of the flange 57 has teeth formed about its circumference much as an annular gear and cooperates with the ratchet mechanism 13 to advance the platen or table 12 an incremental 2.8 degrees upon each operation of the ratchet or stepping relay 25. While it cannot be determined from FIGS. 1 and 3, the number of teeth on the annular gear 61 is 128, which number provide the 2.8 degrees advancement upon each operation of the ratchet mechanism 13.

The ratchet mechanism 13 may be most clearly seen as it cooperates with the annular gear 61 in FIG. 3. The mechanism 13 includes the electromagnetic relay 25 having an armature 62 pivoted at a knife edge 63. A spring 64 acts to urge the armature to its reelased position, separated from the pole face 65, during the time the coil of the relay 25 is de-energized. The armature 62 is L-shaped and the leg remote from the pivot point 63 has attached thereto or engages contact 1 associated with relay 25 so as to displace it or separate it from contact 2 when relay 25 is energized.

A ratchet finger 68 is affixed to the L-shaped armature 62 so that movement of the armature into contact with the pole face 65 causes the free end 69 of the finger 68 to engage one of the inter-tooth grooves on annular gear 61. A stabilizer 71 is affixed to the bottom part of the platen 12 to act as a stabilizing device for the finger 68 during its operation and an anti-reverse assembly 72 is also attached to the underside of the platen 12 to prevent counter-rotation of the platen 12. The latter includes finger 73 which engages a tooth too removed from that of the pick-up finger tip 69 to prevent pick-up finger 68 from engaging or skipping more than one tooth on gear 61 responsive to each operation of relay 25. Also provided to cooperate with the relay 25 is an armature back stop adjustment 76, adaptable to set the amount of movement of While the invention has been described in detail with reference to an exemplary embodiment, it should be apparent to those skilled in the art that modifications may be perceived without departing from the spirit and scope of the invention. For this reason, the invention should be limited only to the extent of the appended claims.

I claim:

1. Apparatus located external to the home of a subscriber for marking a circular charge card to identify and indicate the number of subscription programs selected for viewing by a subscriber of a subscription television system comprising, in combination, a frame having an upstnading shaft affixed thereto, a table rotatably suppored on said shaft, means responsive to the presence of an external pulse signal to rotate said table a preselected number of degrees for each occurrence of said pulse, means forming a part of said table to retain a charge card on the top thereof and index the rotational position of said card with respect to said table, and a pair of solenoids supported overlying the top of said table at different radial distances from the center of said card, said solenoids energizable in response to individual external signals uniquely related to individual ones of said programs to mark the card at the radial distance corresponding to the subscription program selected for viewing by the subscriber, the top of said table having a pair of circular grooves formed therein at radial positions underlying the path of movement of the armatures of said solenoids so that the actuation of a solenoid causes the armature associated therewith to perforate a charge card on the table and to depend into the groove associated therewith.

2. Apparatus located external to the home of a subscriber for marking a circular charge card to identify and indicate the number of subscription programs selected for viewing by a subscriber of a subscription television system comprising, in combination, a frame having an upstanding shaft affixed thereto, a table rotatably supported on said shaft, an annular flange extending from said table, said flange having formed on the interior thereof a plurality of gear teeth extending therearound, a ratchet mechanism supported on said frame and adapted to engage said gear teeth thereby to advance the table a preselected angular increment upon each operation of said ratchet mechanism, means responsive to the presence of an external pulse signal to energize said ratchet mechanism and to rotate said table a preselected number of degrees for each occurrence of said pulse, means forming a part of said table to retain a charge card on the top thereof and index the rotational position of said card with respect to said table, and a pair of solenoids supported overlying the top of said table at different radial distances from the center of said card, said solenoids energizable in response to individual external signals uniquely related to individual ones of said programs to mark the card at the radial distance corresponding to the subscription program selected for viewing by the subscriber.

3. Apparatus in accordance with claim 2 and including means cooperating with the ratchet mechanism to prevent reverse rotation of said table and the rotation of said table beyond said one increment upon each operation of said ratchet mechanism.

4. Apparatus for supporting and marking a circular charge card of a pay television system that has a plurality of unique angular positions marked off that correspond to time intervals during which a number of different pay programs are simultaneously provided for viewing and that has a plurality of circular paths at different radii corresponding to individual ones of the pay programs simultaneously presented for viewing comprising, in combination, a rotatably supported platen, a charge card, means for holding said card on the top of said platen in an indexed position, means for controllably rotating said platen one unit interval each time a program change is effected at a location remote from said apparatus, and marking means associated with each circular path responsive to a selection of one of the simultaneously offered programs to form a punch hole corresponding to the path with which it is associated during the instant interval obtaining.

5. Apparatus in accordance with claim 4 wherein said means for rotating the platen includes a ratchet cooperating with the teeth of an internal gear formed on said platen.

6. Apparatus in accordance with claim 4 wherein the top of said platen has a pair of circular grooves formed therein at radii corresponding to the different radii circular paths and said marking means includes individual solenoids energizable to perforate the charge card along their respective circular paths by depending into the respective grooves associated therewith.

7. Apparatus in accordance with claim 4 and including means to maintain the charge card on the top of said platen and to index said card with respect to said platen to permit correlation of the movement of the platen and the charge card supported thereon from a remote location.

8. Apparatus forming a part of a subscription television system to mark charge cards to reflect the selection by a subscriber of a unique subscription television program comprising, in combination, a frame; a shaft fixedly attached to said frame; a relatively flat table having a flange formed peripherally about its edge and rotatably supported on said shaft, said table having internal gear teeth forming an annular gear along the interior side of said flange and at least two circular grooves of different radii formed in the top of said table; a circular support ring affixed to said frame to stabilize said table by engaging the edge of said flange; means operable to rotate said table a selected angular increment to provide a unique angular position therefor corresponding to the subscription programs offered at any one time, said rotating means including a stepping relay attached to said frame adjacent said annular gear and having an armature, a ratchet finger actuated by the two-way movement of said armature to rotate said table said increment by engaging the teeth on said annular gear and means to energize said stepping relay; at least two solenoid marking devices having longitudinal axes and armatures movable along said axes, a bracket affixed to said frame to support said devices immediately above the top of said table whereby the longitudinal axes of said armatures are normal to the top of said table and in line with respective ones of said grooves, and external means responsive to the selection of a unique one of several subscription programs to operate the marking device associated therewith during the presence of a group of subscription programs evidenced by the instant angular position of said table.

References Cited by the Examiner

UNITED STATES PATENTS

| | | | |
|---|---|---|---|
| 1,259,906 | 3/1918 | Richards | 346—81 X |
| 1,691,017 | 11/1928 | Richert | 346—81 |
| 1,980,494 | 11/1934 | Morse | 346—81 X |
| 2,421,697 | 6/1947 | Hobby. | |
| 2,833,859 | 5/1958 | Rahmel et al. | |
| 2,855,993 | 10/1958 | Rahmel. | |
| 3,051,775 | 8/1962 | Novak et al. | 346—37 X |

NORTON ANSHER, *Primary Examiner.*

EMIL G. ANDERSON, LEO SMILOW, *Examiners.*